United States Patent Office 3,555,585
Patented Jan. 19, 1971

3,555,585
PROCESS FOR FORMING CELLULOSE HALF-ACID ESTERS
John Anthony Cuculo, Wilmington, Del., assignor to E. I. du Pont de Nemours and Company, Wilmington, Del., a corporation of Delaware
No Drawing. Filed May 3, 1968, Ser. No. 726,574
Int. Cl. D06m 13/34
U.S. Cl. 8—116.2                13 Claims

ABSTRACT OF THE DISCLOSURE

The process of forming cellulose half-acid esters which comprises contacting a carbamyl substituted organic acid with cellulose and heating to react said acid with said cellulose to form said half-acid ester; said acid being further characterized as having the carbon atom of the carboxylic group and the carbamyl carbon atom joined by a chain of 2 to 3 carbon atoms.

Also disclosed is the improvement in the production of nonwoven fabrics of regenrated cellulosic fibers to yield fabrics that easily distintegrate in turbulent water and also have adequate in-use integrity for use as disposable devices for absorbing body fluids which comprises treating the fibers of the fabric with a carbamyl substituted organic acid as described above and then converting the fibers of the fabric to a high swelling alkali metal salt form.

BACKGROUND OF THE INVENTION (1) Field of the invention

This invention relates to a novel process for the preparation of half-acid esters of organic dicarboxylic acids.

(2) Description of the prior art

Half-esters of organic dicarboxylic acids are old. They are commonly made by the reaction of the cyclic anhydride of the dibasic acid on an alcohol. They have also been made by the partial hydrolysis of the neutral di-ester, and by partial esterification of the free acid by the alcohol in the presence of an acidic catalyst (Organic Chemistry by A. Bernthsen and J. J. Sudborough page 248, D. Van Nostrand Co., 250 Fourth Avenue, New York, N.Y., 128). Cellulose monoesters of dibasic acids have been prepared by the action of the corresponding anhydride on cellulose in the presence of a basic catalyst such as pyridine (U.S. Pat. 2,069,974 to Schulze dated Feb. 9, 1937) or a tertiary amine or solium acetate (U.S. Pat. 2,505,561 to McIntire dated Apr. 25, 1950).

A method for forming simple esters by the action of ammonium salts of monocarboxylic acids on alcohols at high temperatures is described by Filachione and Costello in Journal of the American Chemical Society for 1951, vol. 73, pp. 5265–7. They adduce evidence that the acid amide is not an intermediate in the reaction and their method failed to yield an ester of the dicarboxylic acid, phthalic acid or of citric acid. Sulfamic acid, the hemiamide of the strong mineral acid $H_2SO_4$ has been shown to react with cellulose in the presence of a large amount of urea to form cellulose acid sulfate (U.S. Pat. 2,511,229 to Thomas dated June 13, 1950). The use of urea, however, inhibits the process of the present invention, rather than promoting it.

SUMMARY OF THE INVENTION

The present invention is the process of forming the half-esters of organic dicarboxylic acids by heating a beta-carbamyl acid or gamma-carbamyl acid with an alcohol.

The process is particularly useful with alcohols that are polyhydroxy compounds.

A preferred process consists of contacting a solid polyhydroxy compound with an aqueous solution of the carbamyl acid and heating to a temperature above 120° C. for a sufficient time interval to react the polyhydroxy compound with the carbamyl acid.

The process of the present invention is more specifically described as the process of forming cellulose half-acid esters which comprises contacting a carbamyl substituted organic acid with cellulose and heating to react said acid with said cellulose to form said half-acid ester; said acid being further characterized as having the carbon atom of the carboxylic group and the carbamyl carbon atom joined by a chain of 2 to 3 carbon atoms.

A particularly useful embodiment of the invention is the modification of nonwoven fabrics to yield disposable fabrics. This embodiment is specifically defined as in the production of nonwoven fabrics of regenerated cellulosic fibers, the improvement of modifying the fibers to yield nonwoven fabrics that easily disintegrate in turbulent water and also have adequate in-use integrity for use as disposable devices for absorbing body fluids, wherein the improvement comprises impregnating the fibers with an aqueous solution of a carbamyl substituted organic acid in which the carbon atom of the carboxylic group and the carbamyl carbon atom are joined by a divalent alkylene group having a chain of 2 to 3 carbon atoms or a divalent ortho-phenylene group; heating the fibers within the temperature range of about 120° C. to about 210° C. until the cellulosic fibers have a degree of substitution within the range of about 0.15 to about 0.40; converting the fibers to a high swelling alkali metal salt form; and then drying the fibers.

DESCRIPTION OF THE PREFERRED EMBODIMENTS

Suitable acids.—Suitable beta-carbamyl acids include succinamic acid, maleamic and ortho-phthalamic acid as well as substitution products containing such groups as alkyl, alkyloxy, halogen, nitro, and hydroxyl.

Glutaramic acid and its substituted derivatives such as mentioned above are examples of satisfactory gamma-carbamyl acids. The suitable acids are hereafter referred to as "amic acids."

Suitable alcohols.—The process of this invention may be used to form the half ester of a primary alcohol. It may also be used with secondary alcohols, but the reaction does not take place as rapidly in this case and side reactions may become more prominent. No added solvent is required for the mixture of amic acid and alcohol. In some cases the liquid alcohol will form the reaction medium. In other cases the reaction temperature will be sufficient to melt the amic acid and provide a fluid reaction mixture.

The process is particularly useful with solid polyhydroxy compounds. One or both of the reactants remain in the solid state throughout the reaction. By the phrase "solid polyhydroxy compounds" is meant high molecular weight substances containing a multiplicity of hydroxyl groups such as cellulose, starch and synthetic polymers as polyvinyl alcohol, copolymers containing polyvinyl alcohol, poly(isopropenyl alcohol) and its copolymers and the like. Such synthetic polymers are obtained by hydrolyzing homopolymers or copolymers of a vinyl ester such as vinyl acetate or isopropenyl acetate.

The solid polyhydroxy compound can be in any convenient form such as fibers, woven or knitted fabrics of the fibers, nonwoven fabrics, wood pulp, cotton linters, films, granules, or powders.

A preferred solid polyhydroxy compound is regenerated cellulose in the form of fibers. This includes all cellulose fibers formed from a solution such as viscose rayon, cuprammonium rayon, deacetylated cellulose acetate fibers, denitrated nitre-silk and the like. Fibers made from low substituted cellulose derivatives such as hydroxy ethyl cellulose or methyl cellulose may also be used.

The following discussion of process and examples will be in terms of fibers and more frequently fabrics of the fibers of solid polyhydroxy compounds although it will be understood that the comments also apply to other forms as powders, films, etc.

The amic acid is applied as a powder, melt, dispersion or solution to the solid polyhydroxy compound and the reaction is brought to completion quickly and easily by a simple baking process.

The amic acids are conveniently applied to fabrics in an aqueous solution with greater uniformity, accuracy of dosage, and cleanliness than with other techniques. Near-saturated solutions are preferred in order to keep the amount of water to be dried out to a minimum. Elevated temperatures may be used to increase the solubility of the amic acid. For example, succinamic acid may be used as a 17% solution at 40° C. or as a 30% solution at 60° C. Unless otherwise specified, all solution concentrations are expressed as percent by weight.

The amic acid esterification reaction usually proceeds at a satisfactory rate merely as the result of the application of heat and no catalyst is necessary. However, catalysts may be used if desired. Materials that have an effect in promoting the esterification include sulfamic acid, p-toluenesulfonic acid, zinc chloride, magnesium chloride, and the like.

When using a solution, the fabric is soaked in the amic acid solution long enough to thoroughly wet it so it will retain the quantity of reagent desired. The phrase "pickup" (i.e., weight of solution in the fabric/original dry weight of fabric) is used to indicate the amount of reagent used. The pickup desired will vary with the particular amic acid used, the concentration of the acid, and the extent of reaction. In general, the fabric should contain from 1.5 to 25 times or more the theoretical amount of acid for the extent of reaction desired. Thus, pickups can vary from as low as 0.2 using a 30% solution of succinamic acid to produce a low extent of reaction to pickups of 5.5 or more with more dilute solutions or higher degrees of reaction.

Excess solution picked up in the soaking process is removed by centrifuging or by the application of pressure. In the preferred continuous process using a warp sheet or pre-formed fabric, the fibers are run through a dip tank of solution, and then between conventional squeeze rolls adjusted to leave the desired amount of liquid on the fibers. Alternatively, the exact amount of solution needed is applied directly to the moving warp sheet or fabric by means of a conventional padder. In this case no excess solution need be removed.

The fibers that have been treated with the required amount of amic acid reagent solution may be dried slowly at room temperature or slightly elevated temperature. In the interest of speed and economy it is preferred to dry the fibers as part of the high-temperature reaction operation while maintaining a high humidity atmosphere during the drying stage of the process.

The heating of the fibers to bring about reaction can be carried out by any known means that allows reasonably careful control of the time and temperature of reaction. Hot circulating air ovens, or in the case where sheet materials are used, heated rolls may be used. In the preferred process using a pre-formed entangled-fiber nonwoven fabric, a tenter frame provides a convenient means for holding the fabric flat and at the desired dimensions while exposing it to a controlled flow of hot air to drive off water and bring about the esterification reaction.

An appropriate choice of reaction conditions is illustrated in the examples. As with most chemical reactions, higher temperatures lead to higher reaction rates and lower reaction times while lower temperatures result in lower reaction rates that require longer reaction times to achieve the same result.

It has been found useful in some instances to conduct the entire reaction in the presence of some water vapor. It may be desirable to perform repeated treatments to obtain the degree of modification desired.

Purification and after treatments.—The fibers or fabric obtained by the operation of the process of this invention on regenerated cellulose are contaminated with excess amic acid, small amounts of the corresponding dibasic acid, and a little of various decomposition products at the end of the high-temperature reaction. These impurities are easily removed by means of a water wash. Since the half ester formed in the reaction is in the free acid form, the fibers of the preferred products (D.S. of 0.2 to 0.3) are low-swelling and no damage is sustained by the fibers or fabric in this treatment.

The final washed fabric, whether arrived at by modifying pre-formed fabric, or by forming fabric from pre-modified fibers is next converted to the more useful high-swelling form by treatment with a base, preferably slightly alkaline buffer such as disodium phosphate to form the sodium salt of the acid groups. In order to prevent excessive swelling and possible solution or other damage in the alkaline medium, the buffer is mixed with a solution of a deswelling salt such as sodium sulfate to form a solution having a pH within the range of about 5 to 9. Other strongly ionizing salts such as ammonium sulfate or sodium citrate may also be used, but sodium sulfate appears to be the most effective and economical, and the most desirable as a minor residual solid in the final fabric. Suitable salts are discussed in U.S. Pat. 3,328,892 to Man, dated July 4, 1967. In order to prevent stiffening or harshening during drying the fabric is dried directly while still wet with the deswelling buffered salt solution. Mechanical working during drying helps to soften the fabric and remove excess free salt. If a salt-free final product is desired, it may be obtained in a softened form by extracting the buffered salt solution with aqueous alcohol or acetone, rinsing in dry alcohol or acetone, and then drying with heat. Alternatively, the use of salt may be minimized by neutralizing the free acid groups in the fabric with an aqueous alcohol solution of a buffer or dilute alkali, followed by an alcohol or acetone wash, and then drying with heat.

The extent of reaction with the hydroxyl groups of cellulose is usually stated in terms of Degree of Substitution (D.S.) which is the ratio of the moles of acid esterified to the moles of anhydroglucose. Thus the maximum D.S. is 3.0.

Utility of the products.—The products of the process with solid polyhydroxy compounds are useful in a number of ways. They may be used as cation exchange mediums. The sodium or ammonium salts are soluble in dilute alkali and the solutions are useful in the formation of films and fibers. Fibers of the products may be treated with certain heavy metal ions such as copper ions to give increased resistance to mildew and decay. The moisture absorbency and dyeability of solid polyhydroxy compounds such as cotton or rayon can be increased by reacting the fibers in this process. An especially valuable application of appropriately modified fibers (e.g., D.S. of about 0.15 to 0.4 for rayon) is in the form of entangled nonwoven fabrics that are disposable in home toilets.

Nonwoven fabrics of entangled fibers are conveniently made by treating a fibrous web with fine, closely-spaced, liquid streams issuing from orifices at high pressures as taught in Britist Pat. No. 1,088,376, published Oct. 25, 1967.

Typically a web of 1.2 ounces/square yard, herein after oz./yd.$^2$ (41 grams/square meter or g./m.$^2$) of 1.5 denier per filament (d.p.f.), 0.75 inch (1.9 cm.) long rayon staple in a random array made by air deposition is placed on a 20 x 24 mesh per inch (per 2.54 cm.) screen (16% open area) and passed at 5 yds./minute (4.6 m.p.m.) under 3 rows of water streams coming from orifices having an upper cylindrical section of 0.005 inch (0.13 mm.) diameter with a lower frustoconical section as an exit and spaced 40 per inch (per 2.54 cm.) at pressures of 400, 500 and 600 pounds per square inch (28, 35 and 42 kilograms per square centimeter, kg./cm.$^2$) respectively (all pressure are gauge). The orifices are about 12 mm. above the web. This strong, integral nonwoven fabric (A) having a pattern of appertures is used in Example 1.

Random webs of the above rayon fibers and general procedures are used to make nonwoven fabrics under the following conditions:

|  | Fabric designation | | | |
| --- | --- | --- | --- | --- |
|  | B | C | D | E [1] |
| Used in Example | 2 | 3, 5, 7 | 6 | 4 |
| Fabric weight, oz./yd.$^2$ | 1.0 | 1.4 | 1.2 | 1.0 |
| Screen, mesh | 24 | 20 | 24 | 24 |
| Screen, open area | 16 | 36 | 16 | 27 |
| Pressure, p.s.i.: | | | | |
| Row: 1 | 400 | 200 | 300 | 50 |
| 2 | 500 | 300 | 500 | 400 |
| 3 | 600 | 2500 | 600 | 400 |
| 4 | 0 | 2500 | 700 | 400 |
| 5 | 0 | [2]600 | 900 | 400 |
| Speed, y.p.m. | 5.0 | 5 | 7.0 | 6.7 |

[1] Fari E is made with separate treatments at each of the pressures shown.
[2] Orifices of 0.007 inch (0.18 mm.) spaced 40 per inch.

Tensile strengths and elongations are measured on 1-inch (2.5 cm.) wide samples on an Instron testing machine using a 2-inch (5 cm.) length between the jaws and elongating at 50% per minute. All samples are conditioned and run at 65% relative humidity and 22.2° C.

The degree of substitution of a cellulose product of this invention is calculated from carboxyl group analysis. A portion of a sample is treated with sulfuric acid to insure conversion to the carboxylic acid form, washed free of acid, and then dried. A weighed portion of the dried product is shaken with a measured amount of calcium acetate solution. The acetic acid liberated is back titrated with 0.1 N NaOH and percent of acid groups calculated.

Example 1.—This example illustrates a continuous process for the preparation of cellulose sodium hemi succinate.

A nonwoven rayon fabric (A) is passed through a tank containing an aqueous solution at 60° C. and 30% succinamic acid and 0.60% sulfamic acid, and squeezed by rolls to a pickup of about 2.0–2.1. The wet fabric is continuously passed through a circulating air oven (205° C.) at a speed to give a residence time of about 98 seconds. The fabric reaches a temperature of 140° in from 27 to 42 seconds.

The fabric of cellulose hemi succinate is washed by passing through a tank of soft water, squeezed and then neutralized and bleached by passing through a tank containing an aqueous solution at room temperature of 3% $Na_2HPO_4$, 17% $Na_2SO_4$ and about 0.5% $KHSO_5$ (as a bleaching agent) adjusted to a pH of about 8.5–9.0. The fabric of cellulose sodium hemi succinate is squeezed and dried in circulating air at room temperature.

The fabric has the following properties (MD refers to the machine direction and CD to the cross direction):

Degree of Substitution—0.30
Tensile, MD/CD, lb./in.:
  Dry—4.2/3.0 (750/540 g./cm.)
  Wet, distilled water—0.017/0.11 (3.0/20 g./cm.)
  Wet, urine (blot)—0.49/0.40 (88/71 g./cm.)
Febric weight, salt-free—1.5 oz./yd.$^2$ (51 g./m.$^2$)
Dry elongation—27/44%

Diapers made of the product are tested on babies and found to have excellent integrity in use and the used diapers are completely flushable in a home toilet.

Example 2.—This example shows a rapid process for preparation of cellulose hemi succinate.

Portions (5 x 8 inches, 12.7 x 20 cm.) of nonwoven rayon fabric B are placed in a 30% aqueous solution at about 60° C. of succinamic acid containing 2 grams of sulfamic acid per 100 g. of succinamic acid for about 1 minute, drained and squeezed to obtain a pickup of 1.5 (i.e., 0.62 mole of acid per mole of anhydroglucose).

The wet fabric (attached to a thermocouple) is hung in a laboratory circulating air oven containing a pan of water. The fabric is surrounded by an open-ended metal box to protect it from the direct flow of air. Some results are given below:

|  | Temperature, °C. | | Time, minutes | D.S. |
| --- | --- | --- | --- | --- |
|  | Oven | Fabric | | |
| Item: | | | | |
| a | 205 | 72–136 | 0.5 | 0.03 |
| b | 222 | 75–207 | 1.0 | 0.25 |
| c | 222 | 58–183 | 1.0 | 0.24 |

In each case it requires the first 20 seconds of heating for the fabric to reach a temperature of 100–120° C.

Example 3.—This example illustrates a range of process variables in the reaction of rayon with succinamic acid.

Portions (10 x 10 inches, 25 x 25 cm.) of nonwoven rayon fabric C are each soaked for 2 minutes in 100 grams each of a 19% aqueous solution of succinamic acid, drained, pressed to the desired pickup, and heated on a paper sheet dryer. The dried, reacted fabrics are washed in tap water, soaked in an aqueous solution containing 17% $Na_2SO_4$ and 3% $Na_2HPO_4$ adjusted to a pH of about 8.5, blotted and dried in a home tumbler dryer.

The sheet dryer comprises a heated, curved metal plate, a thin cover of Teflon film upon which the wet fabric rests and a top metal screen cover.

Results are given in Table I

Other samples are made using the above procedure with different concentrations of succinamic acid in the dipping solution and heated for seven minutes at 150° C. with the below results:

|  | Solution percent acid (by weight) | Pickup | D.S. |
| --- | --- | --- | --- |
| Item: | | | |
| p | 15.0 | 4.5 | 0.25 |
| q | 21.0 | 4.8 | 0.24 |
| r | 25.0 | 4.4 | 0.21 |

The percent of succinamic acid based on the dry weight of the fabric varies from 41.8% for item 1 to 110% for item r.

Similar results are obtained when the nonwoven fabric is replaced with woven fabric of rayon, a skein of rayon fibers or a sheet of uncoated cellophane.

TABLE I

|  | Pickup | Temperature, dryer, °C. | Heating time, minutes | D.S. |
| --- | --- | --- | --- | --- |
| Item: | | | | |
| a | 4.5 | 110 | 10.0 | 0.05 |
| b | 4.5 | 120 | 10.0 | 0.07 |
| c | 4.5 | 130 | 10.0 | 0.11 |
| d | 4.5 | 150 | 10.0 | 0.32 |
| e | 4.5 | 170 | 10.0 | 0.46 |
| f | 4.5 | 190 | 10.0 | 0.47 |
| g | 4.5 | 150 | 3.0 | 0.06 |
| h | 4.5 | 150 | 4.0 | 0.17 |
| i | 4.5 | 150 | 7.0 | 0.26 |
| j | 4.5 | 150 | 15.0 | 0.40 |
| k | 4.5 | 150 | 30.0 | 0.43 |
| l | 2.2 | 150 | 7.0 | 0.19 |
| m | 3.0 | 150 | 7.0 | 0.23 |
| n | 4.0 | 150 | 7.0 | 0.19 |
| o | 5.5 | 150 | 7.0 | 0.13 |

Example 4.—This example shows the reaction with cotton fibers.

The starting material is a 1 oz./yd.$^2$ (34 g./m.$^2$), entangled nonwoven fabric of cotton that has been made under conditions of fabric E. The fabric is boiled for 30 minutes in a detergent solution to remove the wax, rinsed and dried.

A portion of the fabric is soaked in a 16.7% aqueous solution of succinamic acid for 2 to 3 minutes, drained, pressed to a pickup of 5.7, heated on the sheet dryer of Example 3 for 7 minutes at 150° C. and then washed and treated as in Example 3 to give a strong nonwoven fabric with a D.S. of 0.10.

Another portion of the fabric is treated in a similar manner with a 25% solution of succinamic acid containing 2% $MgCl_2 \cdot 6H_2O$ (based on succinamic acid). The fabric with a pickup of 8.1 is treated for 7 minutes at 150° C., washed, dried, resoaked to a pickup of 5.7 and again baked to give a product with a D.S. of 0.14.

Example 5.—This example illustrates the reaction between phthalamic acid and rayon.

A portion of rayon, nonwoven fabric C is soaked for 2 minutes in 23% aqueous solution of phthalamic acid containing 2% $MgCl_2 \cdot 6H_2O$ based on the acid, drained, pressed to a pickup of 4.5 and baked for 7 minutes at 150° C. on a sheet dryer. The product is washed, converted to the salt form (sodium cellulose hemiphthalate) and dried using the procedure of Example 3. The cellulose has reacted as evidenced by the increased dispersibility in water compared to the original.

The above product is treated a second time (pickup of 3.4), baked, and after treated to give a final product with a D.S. of 0.36.

Example 6.—This example illustrates the reaction of glutaramic acid and rayon.

A portion of a rayon, nonwoven fabric (D) is soaked for 1 minute in a 30% aqueous solution of glutaramic acid containing 2% (based on glutaramic acid) sulfamic acid and drained, pressed to a pickup of 2.5 and baked for 7 minutes in a laboratory circulating air oven at 152° C. The purified product has a D.S. of 0.05. Analysis of the original rayon fabric gives an apparent D.S. (as glutaramic acid) of 0.0065.

Example 7.—This example illustrates the reaction of maleamic acid and rayon.

A portion of a rayon nonwoven fabric C is soaked in 20% aqueous solution of maleamic acid, drained, pressed to a pickup of 5.0 and baked 7 minutes in the oven of Example 6 at 147° C.

The fabric (after washing, treating with the buffered salt solution of Example 3 and then drying) displays a water absorbency of about twice that of the original fabric and a significant degree of dispersibility compared to none for the original fabric. These results indicate that a finite extent of reaction has taken place.

What is claimed is:

1. In the production of nonwoven fabrics of regenerated cellulosic fibers, the improvement of modifying the fibers to yield nonwoven fabrics that easily disintegrate in turbulent water and also have adequate in-use integrity for use as disposable devices for absorbing body fluids, wherein the improvement comprises impregnating the fibers with an aqueous solution of a carbamyl substituted carboxylic acid in which the carbon atom of the carboxylic group and the carbamyl carbon atom are joined by a divalent alkylene group having a chain of 2 to 3 carbon atoms or a divalent ortho-phenylene group; heating the fibers within the temperature range of about 120° C. to about 210° C. until the cellulosic fibers have a degree of substitution within the range of about 0.15 to about 4.40; converting the fibers to a high swelling alkali-metal salt form by contacting the fibers with a buffered sodium salt solution having a pH within the range of about 5 to 9; and then drying the fibers.

2. The process as in claim 1 wherein said aqueous solution contains from 15 to 35 parts by weight of the substituted carbamyl acid per 100 parts of solution and said fibers are impregnated with 1 to 6 times their weight of the solution.

3. The process as in claim 1 wherein said carbamyl acid is succinamic acid.

4. The process as in claim 1 wherein said acid is a beta carbamyl substituted carboxylic acid.

5. The process as in claim 1 wherein said acid is a gamma carbamyl substituted carboxylic acid.

6. The process of forming cellulose half-acid esters which comprises contacting an aqueous solution containing a carbamyl substituted carboxylic acid with cellulose and heating at a temperature within the range of about 120° C. to about 210° C. for a period of time to react the acid with the cellulose to react said acid with said cellulose to form said half-acid ester; said acid being further characterized as having the carbon atom of the carboxylic group and the carbamyl carbon atom joined by a chain of 2 to 3 carbon atoms.

7. The process as in claim 6 wherein said carbamyl substituted carboxylic acid is selected from the group consisting of succinamic. phthalamic, glutaramic, and maleamic acids.

8. The process as in claim 6 wherein the cellulose is impregnated with 1 to 6 times its weight of an aqueous solution containing from 15 to 35 parts of said carbamyl acid per part of solution.

9. The process as in claim 6 wherein a catalytic amount of sulfamic acid is included with the carbamyl acid.

10. The process as in claim 6 wherein a catalytic amount of magnesium chloride is included with the carbamyl acid.

11. The process as in claim 6 wherein said cellulose is in the form of fibers.

12. The process as in claim 6 wherein said acid is a beta carbamyl substituted carboxylic acid.

13. The process as in claim 6 wherein said acid is a gamm carbamyl substituted carboxylic acid.

References Cited

UNITED STATES PATENTS 2,069,974  2/1937  Schulze _____ 260—101

OTHER REFERENCES

Cruz-Lagrange et al.: Am. Oy. Rep., June 11, 1962, pp. 40–42.

Gagliardi et al.: Tex. Res. J., February 1967, pp. 118–128.

GEORGE F. LESMES, Primary Examiner

P. C. IVES, Assistant Examiner

U.S. Cl. X.R.

8—129; 260—2.2, 233.5, 218, 226; 264—165

PO-1050
(5/69)

UNITED STATES PATENT OFFICE
CERTIFICATE OF CORRECTION

Patent No. 3,555,585      Dated January 19, 1971

Inventor(s) John Anthony Cuculo

It is certified that error appears in the above-identified patent and that said Letters Patent are hereby corrected as shown below:

Column 8, line 2, "4.40" should read -- 0.40 --.

Signed and sealed this 20th day of April 1971.

(SEAL)
Attest:

EDWARD M. FLETCHER, JR.
Attesting Officer

WILLIAM E. SCHUYLER, JR.
Commissioner of Patents